US006503616B1

(12) United States Patent
Jalan

(10) Patent No.: US 6,503,616 B1
(45) Date of Patent: *Jan. 7, 2003

(54) MICRONIZED PARTICLES

(75) Inventor: Rajesh Jalan, Purwakarta (ID)

(73) Assignee: P. T. Indorama Synthetics, Purwakarta (ID)

( * ) Notice: Subject to any disclaimer, the term of this patent is extended or adjusted under 35 U.S.C. 154(b) by 0 days.

This patent is subject to a terminal disclaimer.

(21) Appl. No.: 09/543,073

(22) Filed: Apr. 5, 2000

Related U.S. Application Data

(63) Continuation-in-part of application No. 09/426,401, filed on Oct. 25, 1999.

(51) Int. Cl.$^7$ ................................................. B32B 5/16
(52) U.S. Cl. ..................... 428/323; 428/325; 428/328; 428/329; 428/330; 428/331; 428/474.4; 428/480; 524/424; 524/425; 524/430; 524/442; 524/450; 524/495
(58) Field of Search ............................. 428/480, 474.4, 428/323, 325, 328, 329, 331, 330; 524/424, 425, 430, 442, 450, 495

(56) References Cited

U.S. PATENT DOCUMENTS

| 4,408,004 A | * 10/1983 | Pengilly ..................... 524/398 |
| 4,535,118 A | * 8/1985 | Pengilly ..................... 524/398 |
| 5,084,352 A | 1/1992 | Percec et al. ................ 428/412 |
| 5,102,948 A | 4/1992 | Deguchi et al. ............. 524/789 |
| 5,278,221 A | * 1/1994 | Siddiqui ..................... 524/493 |
| 5,674,339 A | 10/1997 | Groeger et al. ............. 156/145 |
| 5,736,207 A | 4/1998 | Walther et al. ............. 428/34.7 |
| 5,783,635 A | 7/1998 | Akiyama et al. ........... 525/168 |
| 5,830,544 A | 11/1998 | Kerscher et al. ........... 428/34.5 |
| 5,876,812 A | 3/1999 | Frisk et al. ................. 428/357 |
| 5,939,158 A | 8/1999 | Plotzker .................... 428/35.7 |

FOREIGN PATENT DOCUMENTS

| EP | 0 491 504 A2 | 12/1991 |
| WO | WO 99/33910 | 7/1999 |

* cited by examiner

Primary Examiner—Leszek Kiliman
(74) Attorney, Agent, or Firm—Emch, Schaffer, Schaub & Porcello Co., L.P.A.

(57) ABSTRACT

The low intrinsic viscosity drop, low acetaldehyde, polyesters and polyamides of the invention typically produce packaging materials such as bottles and fibers. The polyester, generally PET, uses additives such as fumed silicon dioxide. The additives are added in small amounts for achieving the following benefits: (i) lower I.V. (intrinsic viscosity) drop during the injection molding process; (ii) lower levels of acetaldehyde in the resultant preforms/bottles. In another embodiment, micronized particles less than 0.1 micron in size hastens the shift of the higher temperature crystallization peak from 160~170° C. to 130~150° C. for virgin and freshly produced polyethylene terephthalate polymer chips and hence shortening or eliminating the expensive relaxation/storage time before other processing. This thereby avoids distorted or fused chips in the finished product.

25 Claims, 2 Drawing Sheets

MICRONIZED PARTICLES

RELATED APPLICATION

This patent application is a continuation-in-part of patent application Ser. No. 09/426,401 filed Oct. 25, 1999 now pending.

TECHNICAL FIELD

This invention relates to low intrinsic viscosity drop, low acetaldehyde, polyesters for producing packaging material such as bottles. More specifically, the polyesters contain additives such as fumed silicon dioxide. In another aspect, this invention relates to certain additives (micronized particles) for the polyesters and for polyamide polymers.

BACKGROUND OF THE INVENTION

Polyethylene terephthalate is a polyester useful in preparing molded bottles to contain a wide variety of commercial liquids. The industry desires that the bottles have excellent strength and a high degree of clarity. The hollow blow molded thermoplastic, such as a thermoplastic polyester or a biaxially oriented polyethylene terephthalate resin, "PET", container, is commonly used to contain food or beverage, has excellent physical properties, durability and a wide range of applications.

Heretofore, various compounds and catalysts have been used in the preparation of polyesters. Industry demands low intrinsic viscosity drop, low acetaldehyde, high clarity, neutral hue and low haze value that upon the normal reheat of a parison used in the blow molding of a polyester bottle, normal molding temperatures and the usual residence times will produce acceptable bottles. Industry, however, has had difficulty in providing the low intrinsic viscosity drop and low acetaldehyde, polyesters.

Industry continues to demand faster production speeds and improved heat rate, yet maintain the low intrinsic viscosity drop, low acetaldehyde, high clarity., neutral hue and low haze values of the polyester. In the past, production has used low levels of amorphous silicon dioxide to provide polyester bottles having a low tendency to stick together during and after molding. The bottles also have a reduced tendency to stick to other bottles during packing and transportation. The amorphous silicon dioxide is a non-crystalline silicon dioxide typically produced from a sol-gel process.

Another road block to industry's demand for better processing are the twin crystallization peaks observed in polyester chips produced from batch or continuous polymerization plant, when a thermal scan is performed using a differential scanning calorimeter or similar instrument. In case of polyethylene terephthalate chips, the peaks range from 130° to 150° C. and from 160° to 170° C. The commercially produced chips require many hours of expensive storage/relaxation time so that the two peaks merge into one peak. If the freshly produced chips are processed further without providing adequate storage/relaxation time, operating problems such as fusion and distortion of chips occur.

BRIEF SUMMARY OF THE INVENTION

This invention is a low intrinsic viscosity drop, low acetaldehyde, polyester resin for producing packaging material such as bottles. The polyester contains additives of fumed silicon dioxide, calcium carbonate or barium sulfate. These additives are added in small amounts for achieving the following benefits:

i) Lower I.V. (Intrinsic Viscosity) drop during the injection molding process.
ii) Lower levels of acetaldehyde in the resultant preforms/bottles.

I have achieved these properties without affecting the strain-hardening properties during the stretch-blow molding operation and without affecting the anti-blemishness in the final bottles.

These additives provide the faster line speeds that production needs. While the addition of carbon black in small quantities in the polyester resin for improving infrared absorption is already known, the further addition of fumed silicon dioxide and/or other additives additionally increases the infrared absorption of the polyester resin without worsening its color as happens with just the addition of carbon black.

In another aspect of this invention, I have discovered that incorporating certain additives such as silicon-dioxide in micronized form in polyester polymer (such as polyethylene terephthalate (PET), polytrimethyleneterephthalate (PTT), polybutyleneterephthalate (PBT) or nylon polymers (such as nylon-6, nylon-66, nylon-610 etc.) result in a number of benefits. The most important of these is to hasten the shifting of the higher crystallization peak from 160~170° C. to 130~150° C. in virgin and freshly produced polyethylene terephthalate polymer chips. This also results in the reduction of melt viscosity in the polyester polymer. Further, the reduction in final processing temperatures during their polymerization leads to lower electrical power consumption. The reduction in final process temperatures during the polymerization of polyester and nylon results in production of chips with less potential to generate acetaldehyde in subsequent steps of production of preforms and bottles. Also, the bulk produced in draw textured synthetic filament yarn form polyester and nylon would be better stabilized since their rate of thermal crystallization is faster.

DETAILED DESCRIPTION OF THE INVENTION

Figure 1:
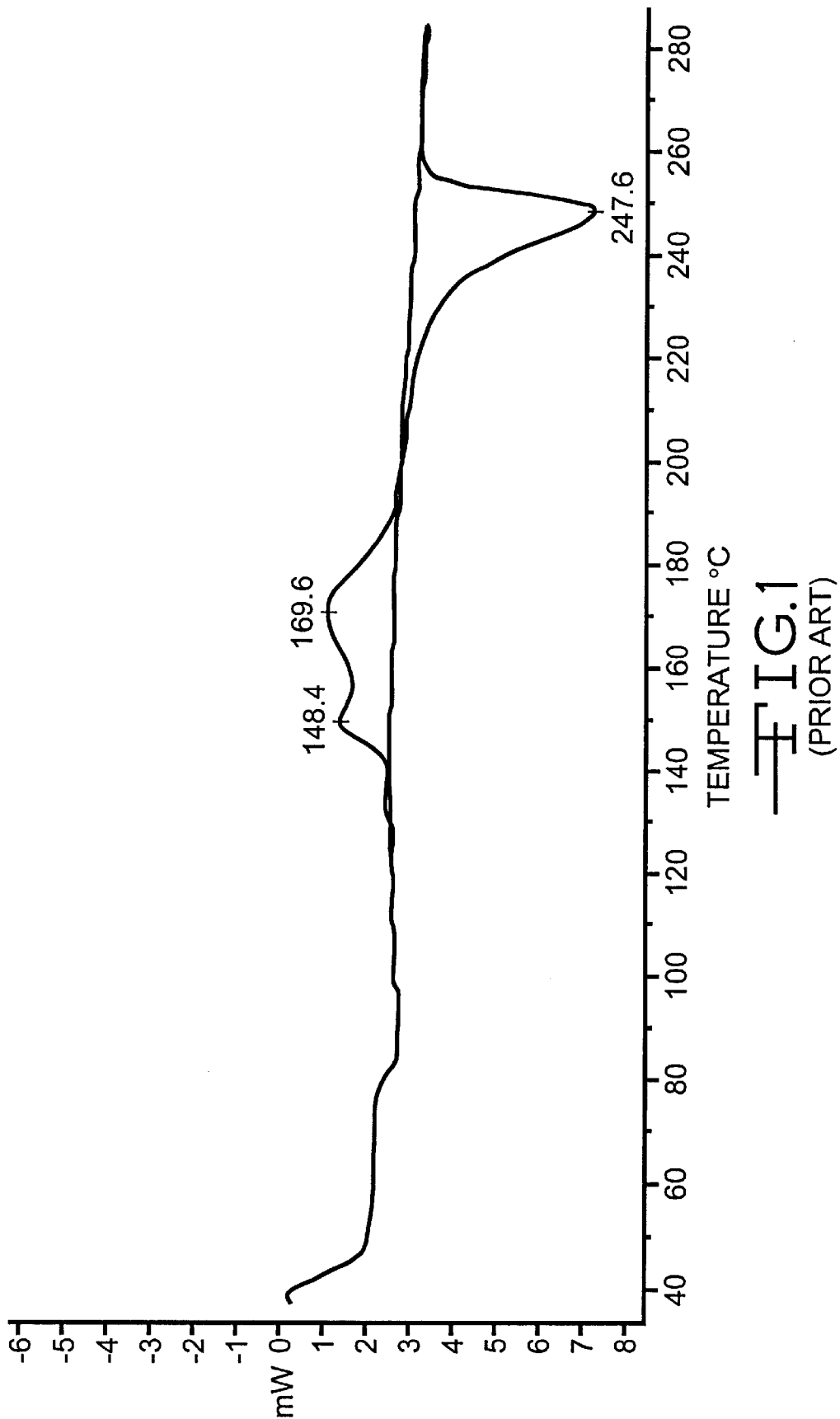
FIG. 1 is a graph of a thermal analysis showing the prior art polyethylene terephthalate polymers having two crystallization peaks.

Generally, the low intrinsic viscosity drop, low acetaldehyde, high clarity, low haze polyester of this invention has a low intrinsic viscosity drop and low acetaldehyde levels. Preferably, the additive is fumed silicon dioxide. Typically, the polyester contains an amount of additive ranging from 1 to 5000 ppm. Preferably, the amount of additive ranges from 10 to 1000 ppm. More preferably, the amount of additive ranges from 10 to 500 ppm.

Typically, the additive is fumed amorphous or crystalline silicon dioxide powder. Preferably, the additive is fumed amorphous silicon dioxide powder. More preferably, the additive is amorphous fume grade silicon dioxide powder. The particle size of such silicon dioxide powder would be <0.1~0.2 micron.

The micronized particles of this invention generally have a particle size ranging from 0.0001 micron (1 Angstrom) to <0.8 micron. More specifically, the particle size ranges from 0.001 to 0.8 micron. Preferably, the particle size ranges from 0.01 to <0.8 micron.

The silica is produced by the hydrolysis of chlorosilanes such as silicon tetrachloride vapor in a flame of hydrogen and oxygen. In the combustion process, molten spheres of silica are formed. The diameters of the silica spheres are varied through process changes from an average of 7 to 21 nanometers. These molten spheres, termed primary particles, collide and fuse with one another to form branched three-dimensional, chain-like aggregates. As the aggregates cool below the fusion temperature of silica (approximately 1710° C.), further collisions results in some reversible mechanical entanglements or agglomeration. Further agglomeration also takes place in the collection process. This entire production process is known as thermal or flame or pyrogenic process and the product is fumed silica.

Sol-Gel silica is produced by wet process by hydrolysis of alkali silicates. It is mainly a precipitated silica. Overall, the morphology difference allows the fumed silica to be several times more effective than the Sol-Gel with regards to rheology control. Fumed silica is available as Cab-O-Sil from Cabot Corporation and Aerosil® from Dugussa A. G. (Germany).

Other micronized additives include barium sulfate, calcium carbonate, titanium dioxide or any other inorganic/organic solid of a particle size smaller than the wavelength of light for transparent end products such as bottles.

Other micronized or non-micronized inorganic or organic additives or solid having particle size bigger than the wavelength of light can be used for translucent/opaque end products. These products include bottles, filaments and fibers for textile, technical and tire cord end uses. These additives are added during the polymerization process, or as a master batch into molten polyester or nylon melt prior to die casting into chips.

When polyester chips are produced with no or very small concentration of additives from batch or continuous polymerization plants, two crystallization peaks are noticed. In case of polyethylene terephthalate chips, the peaks range from 130° to 150° C. and from 160° to 170° C. The peaks are determined from a thermal scan performed on a differential scanning calorimeter or similar device. The commercially produced chips require many hours of expensive storage/relaxation time so that the two peaks merge into one peak. If the freshly produced chips are processed further (example solid state polymerization) without providing adequate storage/relaxation time, operating problems such as fusion and distortion of chips occur.

Generally, the polyester contains a small amount of at least one infrared absorbing material. Preferably, the infrared absorbing material is carbon black. Generally, the amount of infrared absorbing material ranges from 0.1 to 10 ppm. Preferably, the amount of infrared absorbing material ranges from 0.1 to 5 ppm. Generally, the infrared absorbing material has a particle size ranging from 10 to 500 nm.

The major advantages of these additives is the imparting of improved properties to polyester resin used for the manufacture of packaging materials such as bottles. By the addition of novel materials such as silicon dioxide, calcium carbonate and barium sulfate, one or more of these materials provide the following advantages. They reduce I.V. drop in the process of converting the polyester resin chip to preforms. The addition of fumed silicon dioxide provides lower I.V. drops as compared to formulations which do not contain silicon dioxide additive. Lower acetaldehyde levels also result in preforms produced with resin having silicon dioxide additive while converting polyester chips to preforms in injection molding machines. This is done without affecting the strain hardening characteristics of the polyester resin. This leads to material savings in bottles since the required mechanical strength is obtained with lower weight of polyester resin employed in the bottles. Alternatively, at same thickness of bottles, we can achieve better top load and higher burst strength. Bottles with these additives tend to have unaffected anti-blemishness characteristics which are important in uses where bottles are transported in conveyor lines after their production. It results in greater absorption of infrared radiation by addition of the above-mentioned additives in addition to small quantities of carbon black. This overcomes the limitation of carbon black which depresses the color if added in larger concentrations. This makes it possible to further improve the heat-up rates as compared to formulations which rely only on the addition of carbon black.

Generally, the polyester is produced in a conventional manner as from the reaction of a dicarboxylic acid having from 2 to 40 carbon atoms with polyhydric alcohols such as glycols or diols containing from 2 to about 20 carbon atoms. The dicarboxylic acids can be an alkyl having from 2 to 20 carbon atoms, or an aryl, or alkyl substituted aryl containing from 8 to 16 carbon atoms. An alkyl diester having from 4 to 20 carbon atoms or an alkyl substituted aryl diester having from 10 to 20 carbon atoms can also be utilized. Desirably, the diols may contain from 2 to 8 carbon atoms and preferably is ethylene glycol. Moreover, glycol ethers having from 4 to 12 carbon atoms may also be used. Generally, most of the commonly produced polyesters are made from either dimethyl terephthalate or terephthalic acid with ethylene glycol.

The currently preferred aromatic polyester for bottles is polyethylene terephthalate, the product of polymerizing terephthalic acid and ethylene glycol. Polyethylene terephthalate copolyesters can be prepared by including other diacids and/or diols in the condensation polymerization mixture. Alkylene diols such as 1,3-propanediol or 1,4-butanediol, and aromatic diacids (or alkyl esters thereof) such as isophthalic acid or 2,6-naphthalene dicarboxylic acid can be added to the polymerization reaction mixture to make bottle grade polyethylene terephthalate copolyesters.

Typically, the polyester will be formed into bottle preforms and then into bottles. A "preform" is a formed structure that can be expanded in a mold to form a bottle. The manufacture of preforms and bottles is known in the art and any one of a number of suitable techniques can be used to prepare the preform and bottle.

Generally, polyester bottles are prepared in blow-molding processes carried out by heating the preform above the polyester glass transition temperature, placing the heated preform into a mold of the desired bottle form, injecting air into the mold to force the preform into the shape of the mold and ejecting the molded bottle.

The polyester for the preforms and bottles preferably is prepared by reacting a dicarboxylic acid(s) (or esters) and diol(s) under condensation polymerization conditions. This generally is done in the presence of a polycondensation catalyst such as antimony trioxide or an organomagnesium at an elevated temperature and in a reduced pressure environment. The process then adds the desired amount of fumed silica and carbon black to the condensation reaction mixture. The reaction generally is carried out to the point at which the reaction product can be easily pelletized. Then the reaction product is extruded in the desired pellet, cube, chip or other small particle forms.

The fumed silica and carbon black may be added during any stage of the polyester preparation such as the esterification, the transesterification stage, or the condensation stage. In the case of making powdered resins the additives may be added at the compounding state or any subsequent master batch route.

In another embodiment, I have found that quick heating by carbon black in a biaxially oriented polyester film, would enhance the rate of heating and cooling of the film. This improves the productivity of any film manufacturing line. Various other films would benefit from the quick heating by carbon black. Beside oriented PET films, these include orientable polyethylenes such as linear low density polyethylene (LLDPE), linear medium density polyethylene (LMDPE), high density polyethylene (HDPE), and ultra low density linear polyethylene (ULDLPE), and blends of any two or more of such orientable polyethylenes.

Other orientable films include thermoplastic polyurethane elastomers which are basically diisocynates and short chain diols or long chain diols.

Another type of film is a polyamide thermoplastic elastomer. These thermoplastic polyamide elastomers are polyamide, polyether, polyester or polyetherester blocks, as well as their segment lengths.

Still another type of oriented film is a polymer/polymer composite combining polydimethyl siloxane and polytetrafluoroethylene (PTFE).

Preferred polyamides include those semi-crystalline and amorphous resins having a molecular weight of at least 5,000 and commonly referred to as nylons. The polyamide resin can be produced by condensation of equimolar amounts of a saturated dicarboxylic acid containing from 4 to 12 carbon atoms with a diamine containing 4 to 14 carbon atoms. Examples of polyamides include polyhexamethylene adipamide (66 nylons), polyhexamethylene azelamide (69 nylon), polyhexamethylene sebacamide (610 nylon), poly-11-aminoundecanoic acid, and bis(p-aminocyclohexyl) methane dodecanoamide, and polyamides produced by ring opening of lactams, e.g., polycaprolactam, polylauric lactam.

Continuous filaments or fibers are manufactured by flowing molten material through a bushing, followed by attenuating the material. The resultant filaments, after solidifying, may then be directed to another area for conversion into desired products, or collected on a bobbin for storage prior to further processing.

Continuous filaments include a single filament or a plurality of filaments in a strand, with the filament having a continuous length or substantial length, e.g., greater than one foot. A plurality of filaments is a plurality of segments of a single filament in adjacent relationships.

If short fibers are desired, choppers using fluid or electric powered blade rotors break continuous rovings into individual short fiber lengths. These choppers use a hard rubber back up roll as an anvil which cooperates with a rotor carrying one or more transversely extending blades. The back up roll and rotor cooperate to chop a discrete fiber length off the continuous roving each time a rotor blade contacts the back up roll.

In commercial polyester or nylon polymerization processes, the electrical power consumed by the motor driving the agitator in the final reactor is significantly dependent upon the viscosity of the polymer melt. For the same solution viscosity of the final product, the addition of micronized silicon dioxide reduces the viscosity of the polyester or nylon melt. This thereby lowers the electrical power consumed. In most polyethylene terephthalate polymerization melt phase reactors, the productivity of the reactor is dependent up on the rate at which the reaction product i.e. mono ethylene glycol diffuses through the bulk of the polyethylene terephthalate melt. Addition of silicon dioxide etc. reduces the melt viscosity of the polymer, which in turn increases the rate of diffusion of mono ethylene glycol, which results in higher productivity in the reactor.

Figure 2:
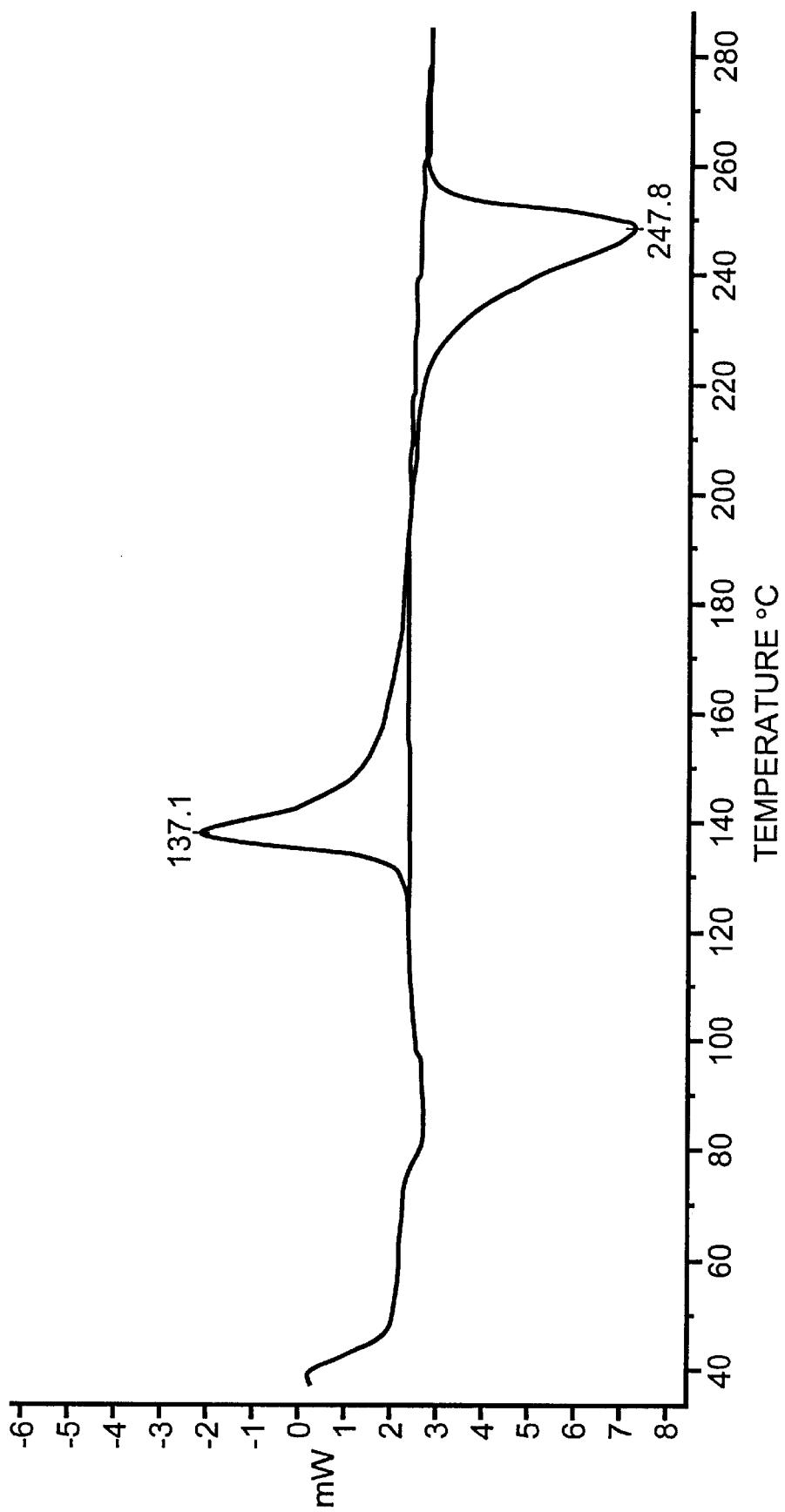
FIG. 2 shows the merging from two crystallization peaks to one according to this invention.

FIGS. 1 and 2 are diagrams from DSC (differential scanning calorimeter) equipment. The specific model I used was a Perkin-Elmer DSC-6. When an amorphous polyester is heated in a DSC, crystallization occurs around 130° to 180° C. Crystallization being exothermic in nature generates heating during the process of crystallization. The peak (single or double) at a temperature from 130° to 180° C. is the crystallization peak. Being exothermic in process, the energy flow (mW) from outside source to heater is stopped and hence there is peak on the Y-axis on the (−) ve direction. This means energy is being released from the polymer and hence there is peak towards (−) ve of Y-axis.

The case is reversed during melting of chips. Melting being endothermic (energy is taken from outside source) there is a lot of consumption of energy and hence there is peak on the (+ve) sign of Y-axis, i.e. melting of crystals and hence melting peak. The melting point is melting of crystals and polymer changes from solid phase to liquid phase. This phenomena takes place from 245~260° C. depending upon the formulation and recipe of polyester polymer and the rate of heating of polymer sample.

Normally, we can have rate of heating at 20° C./minute, 10° C./minute or 5° C./minute. Internationally, industry uses either 20° C./minute or 10° C./minute. In the present case, we have used 20° C./minute heating rate. By changing heating rate, there is slight shift in peak temperature, but the general nature of peak (either crystallization or melting peak) does not change much.

With the improvement in diffusion rate in the final polyethylene terephthalate melt phase polymerization reactor, it is possible to lower the polymerization temperature while maintaining the same production rate. Therefore, addition of silicon dioxide results in lower polymerization temperatures, which is known to reduce the potential for generation of acetaldehyde in the manufacture of preforms/bottles. This is a vital advantage when such bottles are used for bottling mineral water and other beverages. Commercially polyethylene terephthalate chips produced in melt phase polymerization plants are subsequently processed in solid state polymerization plants (SSP) to further increase the solution viscosity of polyethylene terephthalate chips.

The product from SSP plants are used for production of preforms/bottles or for the manufacture of PET sheet, technical yarn and industrial yarn such as tire cord. Frequently, the operating conditions in the SSP reactor results in the sintering of chips leading to equipment blockage, production interruptions and associated production problems. Addition of silicon dioxide, etc. improves the sintering temperature. This effect can be used to avoid the above-mentioned operating problems. Alternatively, the processing temperature in SSP reactor can be increased without sintering the contents, thus improving the productivity of SSP reactor.

Commercial process already exist for thermosetting/ annealing of polyethylene terephthalate bottles in order to improve their hot filling temperatures, gas barrier properties, etc. Addition of the micronized particles further improves such performance characteristics of bottles produced by these processes. Since silicon dioxide reacts with sodium hydroxide solution and becomes soluble, it can be easily leached out of polyester fabrics. Weight reduction with caustic soda solution results into the formation of small holes of nm to micron size in both filaments and fibers in fabric structure leading to higher dye receptivity, better thermal insulation and lower bulk density properties of fabric after this process. The presence of silicon dioxide increases the adhesitivity with various chemicals/rubber during dipping and coating process for polyester and nylon tire cord.

The expression "ppm" as used herein means parts per million parts by weight of the polyester.

The following examples further illustrate this invention.

EXAMPLES 1, 2 AND 3

We prepared a series of polyethylene terephthalate bottles containing various levels of fumed silicon dioxide.

The following table shows the properties and operating conditions for the examples. The Example 1 is a prior art control and contains no silicon dioxide. Examples 2 and 3 contain 20 ppm and 100 ppm of fumed silicon dioxide respectively. Examples 2 and 3 also contain 4 ppm of carbon black.

TABLE I

| S.N. | Properties | Prior Art Control Example 1 | Example 2 | Example 3 |
|---|---|---|---|---|
| 1 | Melt temp. (° C.) during extrusion | 267 | 265 | 263 |
| 2 | I.V. drop (dl/g) from dried chips to preform | −0.055 | −0.048 | −0.047 |
| 3 | Acetaldehyde level (ppm) to preform | +1.94 | +1.87 | +1.75 |
| 4 | Heater output (%) of the blowing machine to produce bottles at a constant speed of @ 925 bottles/hr. | 91 | 83 | 82 |
| 5 | Heater output (%) of the blowing machine to produce bottles at a constant speed of @ 1200 bottle/hr. | Not possible to blow at all | 102 | 100 |

The Data Show (a) Lower drop in I.V.
(b) Lower generation of acetaldehyde.
(c) Action of fumed silicon dioxide in synergy with carbon black during heating and blowing of preform into bottles whereby the productivity is enhanced with respect to control Example 1 at lower heat output at any one constant speed (for example at 925 bottles/hr and at 1200 bottles/hr.

The above three examples, which were synthesized in the laboratory, were also analyzed by Quantitative Near Infrared (NIR spectroscopy. I found out that Examples 2 and 3 were having around 8% to 13% higher heat absorption capacity over Example 1, which did not have any additives (see Table II).

TABLE II

| S.N. | Sample | thickness (nm) | Fraction energy absorbed in NIR range | Energy absorbed relative to first sample |
|---|---|---|---|---|
| 1 | Example-1 Prior Art | 0.1016 | 0.23 | 1.0 |
| 2 | Example-2 | 0.1016 | 0.25 | 1.087 |
| 3 | Example-3 | 0.1016 | 0.26 | 1.130 |

All three recipes were injection molded into preforms (2 liter bottle: 48±0.5 gm) and blown into bottles. The I.V. drop from dried chips to preforms and level of acetaldehyde in preform was determined. The bottles were blown at two blowing speeds. When silicon dioxide is an added in concentration from 0 to 5000 ppm. there is less drop in I.V. in polyester resin in the process of preforms production process. Also, there is less level of acetaldehyde in such resultant preforms. Additionally, the fumed silicon dioxide does not effect the strain-hardening in blowing operation from preform to bottles. This leads to material saving while achieving the same mechanical strength despite less weight of bottles.

EXAMPLES 4 AND 5

FIG. 1 and FIG. 2 show that the addition of silicon dioxide hastens the shifting of the higher temperature crystallization peak from 160~170° C. to 130~150° C. This significantly reduces the costs associated with the storage/relaxation times. Both runs produced fresh PET chips with an I.V. of 0.62. The runs were carried out without any storage/ relaxation time. Both figures show the heating scan conducted on the two samples using Perkin Elmer Thermal Analysis DSC-6 Instrument, which was carried from 40 to 290° at a heating rate of 20° C./min.

FIG. 1 shows Example 4, a prior art run with no additive. The first heating step shows two crystallization peaks at 148.4° C. and 169.6° C.

FIG. 2 shows Example 5, a run with an additive level of 0.01 wt. % micronized silicon dioxide having a particle size of less than 0.1 micron. The thermal scan had a single crystallization peak of 137.1° C. The results clearly show that micronized particles less than 0.1 micron in size hastens the shift of the higher temperature crystallization peak from 160~170° C. to 130~150° C. for virgin and freshly produced PET chips. Hence, this will shorten or eliminate the expensive relaxation/storage time before other processing and avoids distorted or fused chips in the finished product.

Although the now preferred embodiments of the invention have been set forth, it will be apparent to those skilled in the art that various changes and modifications may be made thereto without departing from the spirit and scope of the invention as set forth in the following claims.

I claim:

1. A low intrinsic viscosity drop, low acetaldehyde, polyester or polyamide polymer having a low drop in intrinsic viscosity and a low acetaldehyde level consisting essentially of the polymer and 10 ppm wherein the polymer 10 ppm or higher of an additive of fumed silicon dioxide, calcium carbonate, barium sulfate, titanium dioxide or any other solid particle, wherein the additive has a particle size of less than 0.8 micron.

2. A polymer according to claim 1 wherein the additive has a particle size ranging from 0.0001 micron to <0.8 micron.

3. A polymer according to claim 1 wherein the additive has a particle size ranging from 0.001 micron to <0.8 micron.

4. A polymer according to claim 1 wherein the additive has a particle size ranging from 0.01 micron to <0.8 micron.

5. A polymer according to claim 1 having a single crystallization peak.

6. A polymer according to claim 1 having a single crystallization peak ranging from 130° to 150° C.

7. A polymer according to claim 1 wherein the additive is fumed silicon dioxide.

8. A polymer according claim 1 containing an amount of additive ranging from 10 to 5000 ppm.

9. A polymer according to claim 8 wherein the amount of additive ranges from 10 to 1000 ppm.

10. A polymer according to claim 8 wherein the amount of additive ranges from 10 to 500 ppm.

11. A polymer according to claim 7 containing 20 ppm of silicon dioxide.

12. A polymer according to claim 7 containing 100 ppm of the silicon dioxide.

13. A polymer according to claim 1 wherein the polyester is reaction product of a dicarboxylic acid having from 2 to 40 carbon atoms, or an ester thereof and a diol having from 2 to 20 carbon atoms.

14. A polymer according to claim 1 wherein the polyester is polyethylene terephthalate homopolymer/copolymer.

15. A polymer bottle preform comprising the polyester of claim 1.

16. A polyester molded bottle comprising the polyester of claim 1.

17. A quick heating, biaxially oriented film comprising a polymer according to claim 1.

18. A film according to claim 17 including an effective amount of carbon black.

19. A film according to claim 17 wherein the polymer is a polyester.

20. A film according to claim 17 wherein the polymer is PET.

21. Continuous filaments comprising a polymer according to claim 1.

22. Filaments according to claim 21 wherein the polymer is a nylon.

23. Filaments according to claim 21 wherein the polymer is a reaction product of a saturated dicarboxylic acid containing from 4 to 12 carbon atoms and a diamine containing 4 to 14 carbon atoms.

24. Chopped fibers comprising a polymer according to claim 1.

25. Tire cord comprising a plurality of filaments according to claim 21.

* * * * *

UNITED STATES PATENT AND TRADEMARK OFFICE
CERTIFICATE OF CORRECTION

PATENT NO. : 6,503,616 B1
DATED : January 7, 2003
INVENTOR(S) : Rajesh Jalan

It is certified that error appears in the above-identified patent and that said Letters Patent is hereby corrected as shown below:

<u>Column 8,</u>
Line 57, after "10 ppm", delete "wherein the polymer 10 ppm".

Signed and Sealed this

Twenty-second Day of July, 2003

JAMES E. ROGAN
*Director of the United States Patent and Trademark Office*